No. 630,270. Patented Aug. 1, 1899.
C. O. SOBINSKI.
FEED ROLL FOR WIRE BALE TIE MACHINES.
(Application filed Dec. 7, 1898.)

(No Model.) 4 Sheets—Sheet 1.

WITNESSES
Edward W Turrell
George L Bufy

INVENTOR
Charles O. Sobinski
by
Everil Starek atty

No. 630,270. Patented Aug. 1, 1899.
C. O. SOBINSKI.
FEED ROLL FOR WIRE BALE TIE MACHINES.
(Application filed Dec. 7, 1898.)
(No Model.) 4 Sheets—Sheet 2.

WITNESSES
Edward W. Turrell
George L. Belfrey.

INVENTOR,
Charles O. Sobinski
by
Emil Starek atty.

No. 630,270. Patented Aug. 1, 1899.
C. O. SOBINSKI.
FEED ROLL FOR WIRE BALE TIE MACHINES.
(Application filed Dec. 7, 1898.)
(No Model.) 4 Sheets—Sheet 3.
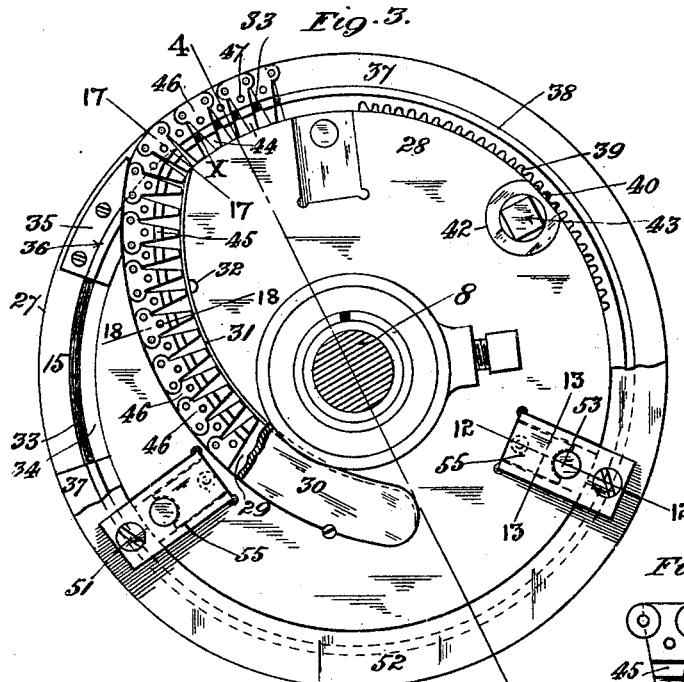
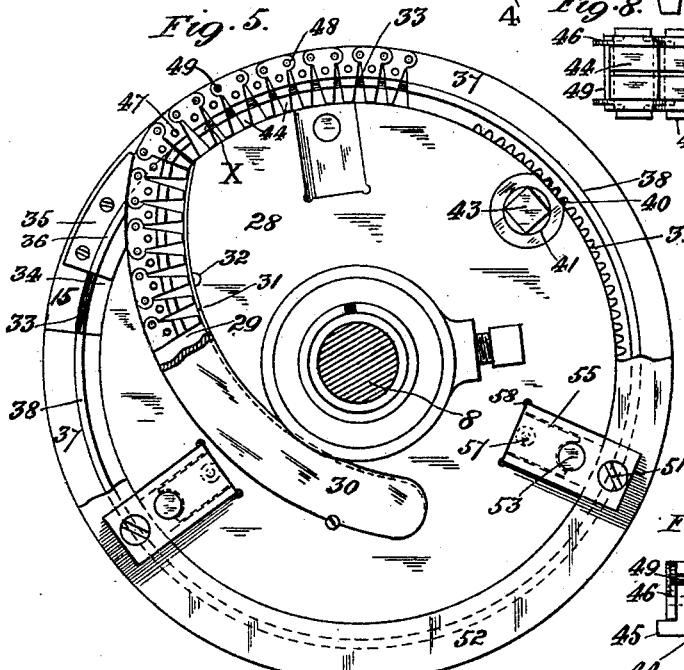
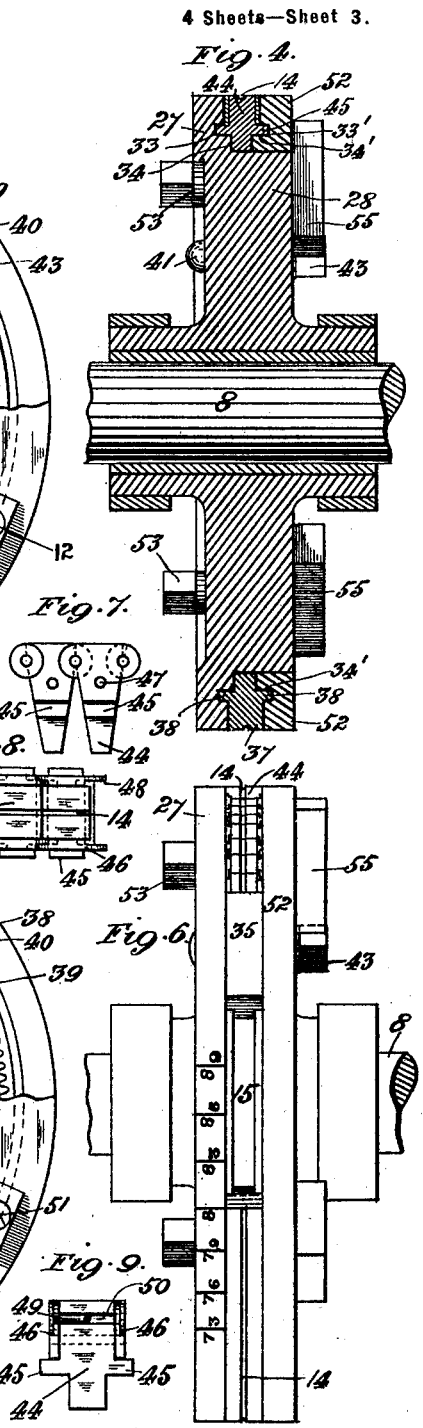
WITNESSES
Edward A. Purrell
George L. Belfry.
INVENTOR
Charles O. Sobinski
by Emil Stauk, atty.

No. 630,270. Patented Aug. 1, 1899.
C. O. SOBINSKI.
FEED ROLL FOR WIRE BALE TIE MACHINES.
(Application filed Dec. 7, 1898.)
(No Model.) 4 Sheets—Sheet 4.
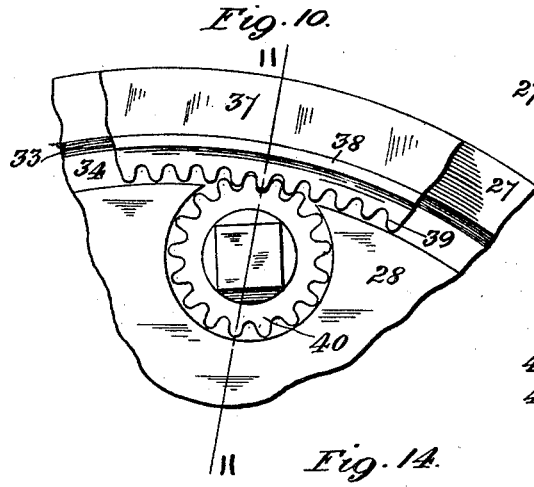
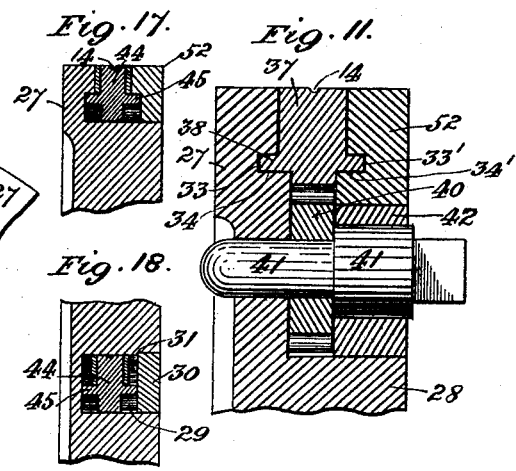
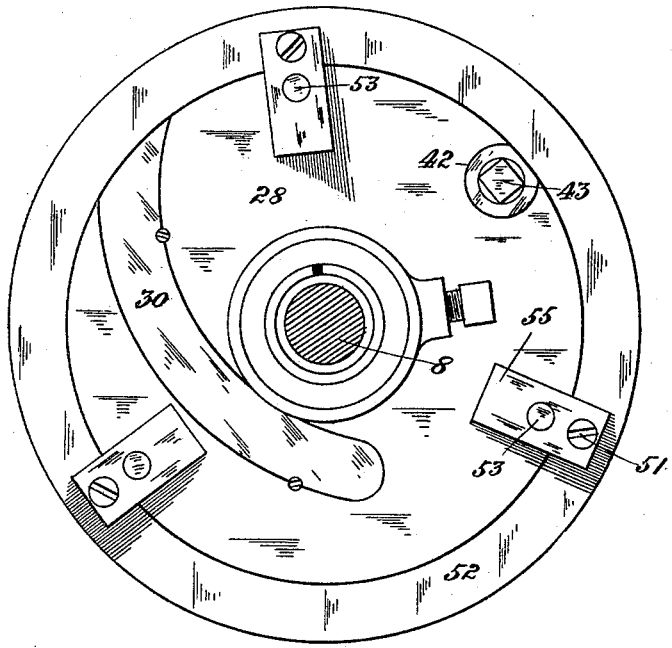
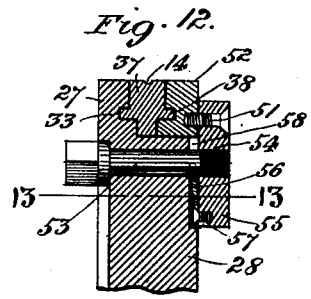
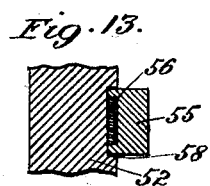
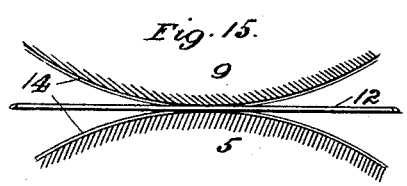
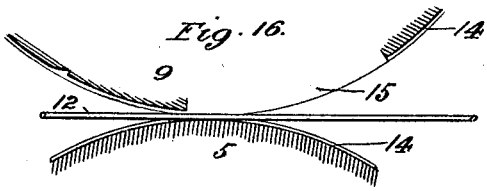
WITNESSES
Edward W. Furrell
George L. Heffy
INVENTOR
Charles O. Sobinski
by Emil Starek, atty

United States Patent Office.

CHARLES O. SOBINSKI, OF ST. LOUIS, MISSOURI, ASSIGNOR TO THE BROCKNER-EVANS BALE TIE COMPANY, OF SAME PLACE.

FEED-ROLL FOR WIRE-BALE-TIE MACHINES.

SPECIFICATION forming part of Letters Patent No. 630,270, dated August 1, 1899.

Application filed December 7, 1898. Serial No. 698,549. (No model.)

*To all whom it may concern:*

Be it known that I, CHARLES O. SOBINSKI, a citizen of the United States, residing at St. Louis, State of Missouri, have invented certain new and useful Improvements in Feed-Rolls for Wire-Bale-Tie and Similar Machines, of which the following is a full, clear, and exact description, reference being had to the accompanying drawings, forming a part hereof.

My invention has relation to improvements in feed-rolls for wire-bale-tie and similar machines; and it consists in the novel arrangement and combination of parts more fully set forth in the specification and pointed out in the claims.

Figure 1:
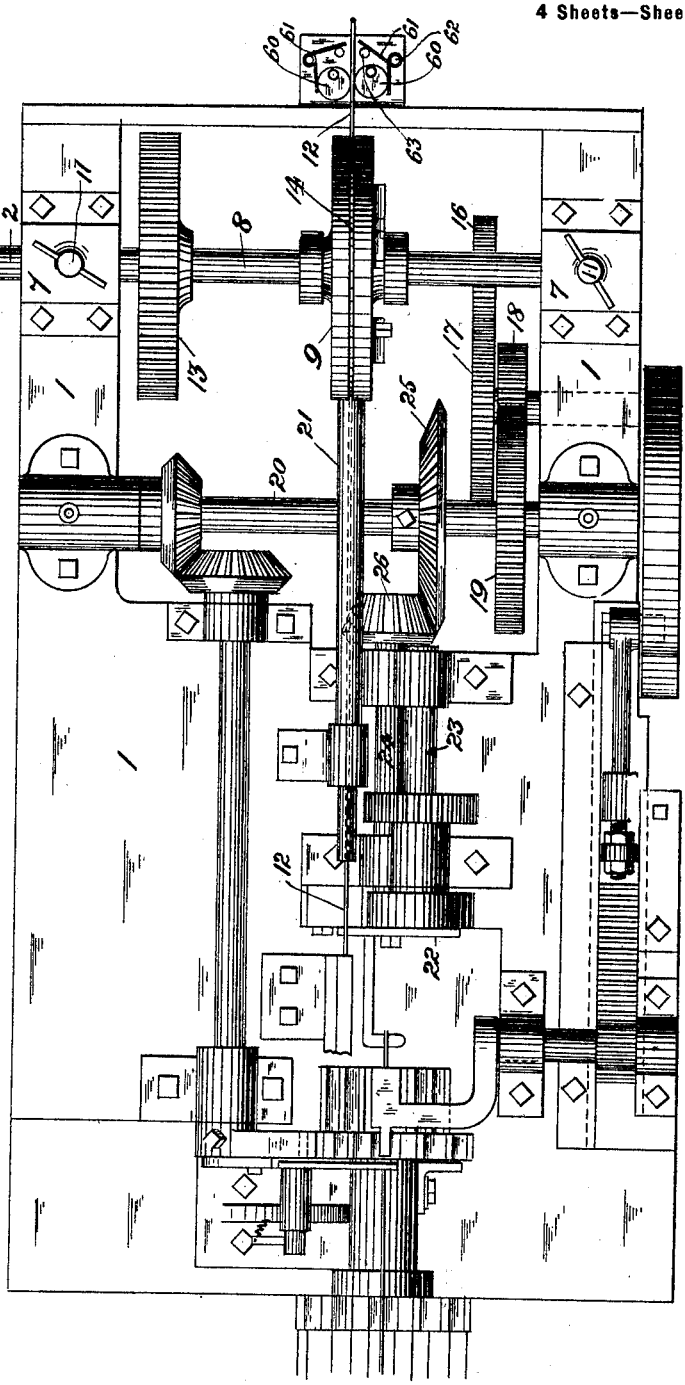
Figure 2:
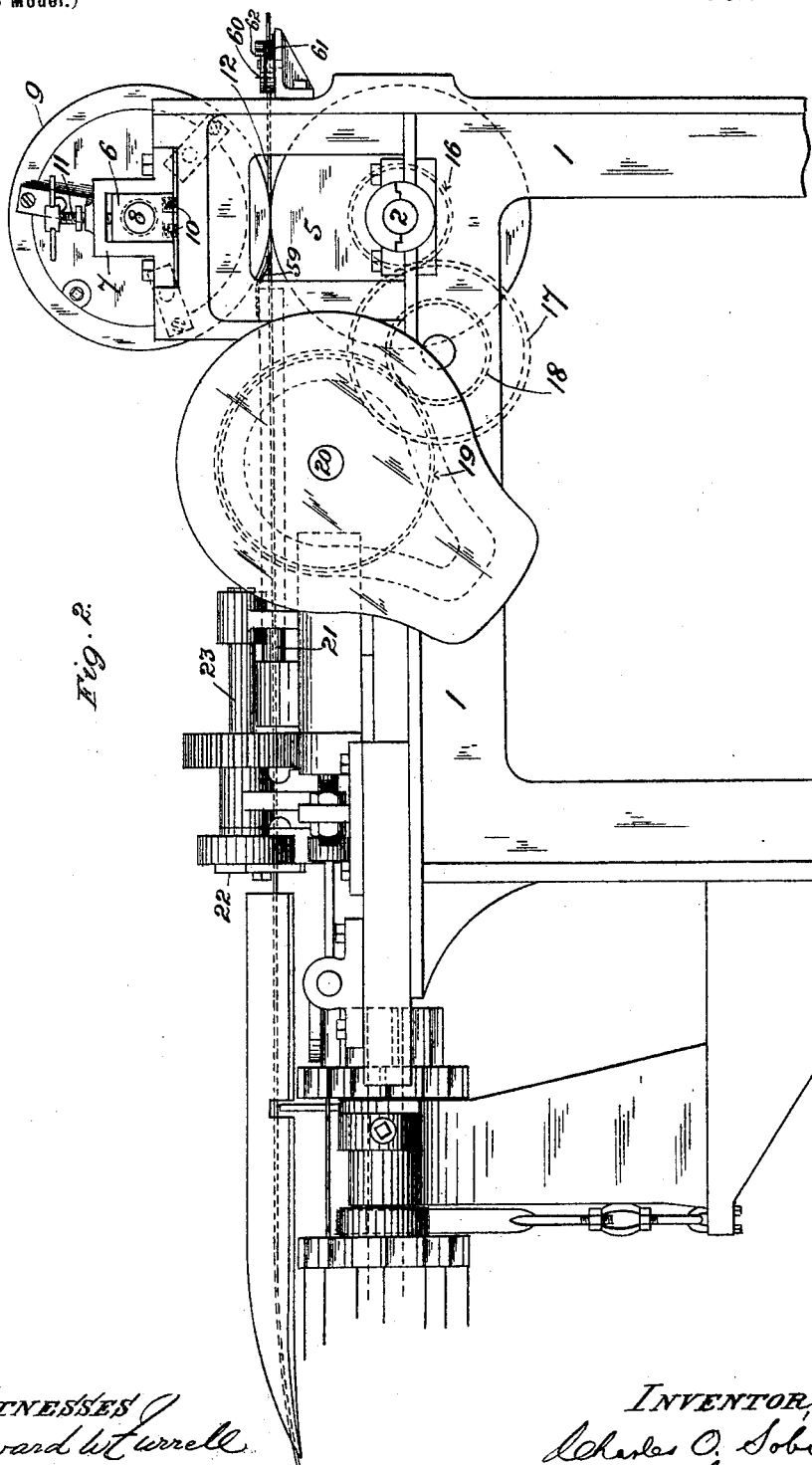

In the drawings, Figure 1 is a top plan view of a wire-bale-tie machine to which my invention is applied. Fig. 2 is a side elevation thereof. Fig. 3 is a face elevation of the improved feed-roll with a section of the clamping-ring removed and with a section of the plug normally covering the pocket formed in the head of the feed-roll also removed. Fig. 4 is a section on line 4 4 of Fig. 3. Fig. 5 is a view similar to Fig. 3, but showing the adjustable wire-gripping band shifted to a different position from that of Fig. 3, whereby the length of the gap between the ends of its available gripping-surface is changed. Fig. 6 is an elevation of the completely-assembled feed-roll, looking to the right of Fig. 3. Fig. 7 is a detail showing in side elevation two of the segments making up the articulated extension of the wire-gripping band coupled together. Fig. 8 is a top plan of Fig. 7. Fig. 9 is an elevation showing the broad side or face of one of the said segments. Fig. 10 is a detail showing in face elevation a fragment of the feed-roll, the clamping-ring being removed, with the toothed portion of the rigid section of the wire-gripping band and with the pinion actuating the same, the detachable plug carrying the spindle of the pinion being removed. Fig. 11 is a section on line 11 11 of Fig. 10 with, however, the plug in place. Fig. 12 is a longitudinal section taken on line 12 12 of Fig. 3 through one of the spring-carrying arms secured to the clamping-ring. Fig. 13 is a section taken through the same arm on line 13 13 of Fig. 3. Fig. 14 is a face elevation of the feed-roll completely assembled. Fig. 15 is a diagrammatic sectional detail showing the wire gripped between the upper and lower feed-rolls. Fig. 16 is a similar view showing the wire released by reason of the gap in the upper feed-roll. Fig. 17 is a detail section on line 17 17 of Fig. 3, showing the inner walls of the grooves formed in the head and coupling-ring cut away opposite the mouth of the pocket which receives the articulated extension of the wire-gripping band; and Fig. 18 is a section on line 18 18 of Fig. 3, showing, however, the plug of the pocket in place.

The present invention is a specific improvement on the feed-roll shown and described in United States Letters Patent granted to Herman E. Schnabel under date of January 4, 1898, and numbered 596,721. Reference to the specification and drawing of said patent discloses the fact that the groove of the lower feed-roll over which the wire passes is deepened for a portion of its length, so as to release the grip on the wire, and thus temporarily stop the feed thereof during the cutting operation. While the specification describes such deepening of the groove in connection with the lower feed-roll, in actual practice it is applied to the upper roll. A uniform length of said deepened portion results in a uniform length of the blanks or strips cut by the machine, and in order to vary the length of the blanks for various lengths of bale-ties it becomes necessary to supply the machine with feed-rolls whose peripheral grooves have different lengths of such deepened portions, for it is obvious that while the wire is released by such deepened section of the groove the feeding of the wire stops. The longer it stops the shorter will be the blank cut off, and the shorter its interval of rest the longer will be the length cut off.

The object of my present invention is to dispense with a large number of feed-rolls each having a different length of the so-called "deepened" section of its peripheral groove and in lieu thereof provide the machine with a single feed-roll, the distance between the ends of whose available gripping-surface can be varied at will, the machine thus turning out variable lengths of wire sections according to the will of the operator and according to circumstances.

While the present feed-roll is specially directed to the patented machine referred to, it will be obvious that the same may be applied to any and all machines of a similar character or to any wire-feeding machine supplying predetermined lengths or sections of wire for any purpose.

In detail the improvement may be described as follows, a partial review of the patented machine being herein resorted to for convenience.

Referring to the drawings, 1 represents the supporting standard or frame, in which is mounted the drive-shaft 2, provided at one end with fast and loose pulleys 3 4, respectively, and carrying the lower feed-roll 5. Mounted over the shaft 2 and supported in the vertically-yielding blocks 6 of the removable bearings 7, which are secured on top of the standard, is a second shaft 8, which carries the upper feed-roll 9. The blocks 6 are directly supported by coiled springs 10, whose upper ends enter depressions or pockets formed in the base of each block and whose lower ends rest directly on top of the standard, passing as they do through openings (not shown) formed for their reception in the lower horizontal wall of the housing, within which the blocks are directly confined, as obvious from Fig. 2. To secure the necessary grip on the wire 12 passing between the rolls, the upper shaft is accurately forced toward the lower shaft against the resilient action of the springs 10 by the screws 11, which operate through the upper walls of the housings which confine the blocks.

The shaft 8 carries a gear-wheel 13, which meshes with a similar gear (not shown) on the shaft 2 immediately below the gear 13. The feed-rolls are provided with peripheral grooves 14 for receiving and gripping the wire, as best shown in Figs. 1, 6, and 15, the periphery of the upper roll being provided (under my present invention) with a blank space or gap 15, whose length can be varied at the will of the operator, said space separating the adjacent ends of the available gripping-surface of said upper roll. The shaft 2 is provided with a pinion 16, meshing with one end of a series of intermediate gears 17 18 19, whereby motion of rotation is imparted to a counter-shaft 20, from which the twisting, cutting, looping, and gripping mechanisms are operated.

21 represents the guide-tube for the wire, the latter being fed in the path of the knife 22 at the outer end of the cutter-shaft 23, driven from the twister-shaft 24 by suitable gearing, the twister-shaft deriving its motion from the shaft 20 through the bevel-gear 25 and pinion 26, respectively.

The foregoing is substantially a review of so much of the description of the specification of the patent aforesaid as suffices to include the cutting mechanism, for what happens to the wire after the completion of the cutting operation is immaterial to a proper explanation of the operation of the devices constituting my present improvement.

This improvement is confined to the upper feed-roll and is as follows: The upper feed-roll is made up of substantially three sections—the first section or body portion, the second section or adjustable peripheral band with its articulated extension, and the third section or coupling-ring. The body portion of the roll comprises a head 27, whose diameter conforms to the diameter of the assembled roll, said head having a diametrically-reduced cylindrical portion or offset 28, along the periphery of which the wire-gripping band and articulated extension constituting the second section travel, the continuity of the peripheral surface of said offset being interrupted at a convenient point by the open mouth of a curved pocket 29, designed to receive the articulated extension of the band, as will presently hereinafter appear.

The curvature of the outer wall of the pocket 29 is described by a radius of equal length with the radius of the roll in order, as will presently be seen, to provide a uniform bearing for the backs or peripheral surfaces of the segments constituting the articulated extension. The pocket when the parts are assembled is closed by a plug 30, supported along its inner curved edge by a ledge 31, formed along the inner wall of the pocket, the plug being secured in place by screws driven through the screw-holes 32, formed partly in the plug and partly in the face of the offset 28. Formed along the inner face of the head 27 and adjacent to the periphery thereof is a circular groove 33, the inner circle of the groove being bounded by a rib or wall 34, raised beyond the plane of the upper edge of the outer wall. (See Fig. 4.) Within this groove is adapted to travel the lateral circular tongue or rib of the second section, (as will presently appear,) the articulated extension thereof being guided into or out of the pocket receiving it by the guide-block 35, secured to the head at a point adjacent to the open mouth of the pocket and in continuation of the curvature of the outer wall thereof, the inner wall or rib 34 of the groove being cut away its full depth opposite the mouth of the pocket (see Fig. 17) to allow for the free passage of the articulated extension into and out of the pocket, the groove with its inner wall thus cut away disappearing at approximately the point marked X in Figs. 3 and 5. The peripheral surface of the guide-block is depressed slightly below the base of the peripheral groove of the second section, which receives the wire, and the face of the block is provided with a tongue or rib 36, disposed along the same arc, with the tongue or rib formed along the adjacent side of the adjustable second section for a purpose which will be presently apparent.

The second section of the feed-roll comprises a rigid open circular band 37, provided along its opposite faces with a rib or tongue 38, adapted to travel in the groove 33 of the head and in a corresponding groove 33' of the third section, as will presently appear. A portion of the inner circle of the band is provided with gear-teeth 39, which mesh with the teeth of a pinion 40, mounted on a spindle 41, carried by a detachable plug 42, secured to the head, the latter having cut therein a cavity large enough to accommodate the pinion. The latter can be turned by a wrench applied to the polygonal head 43 of the spindle. The articulated extension of the band 37 comprises a series of segments 44, tapering in planes parallel to the axis of rotation of the feed-roll, each segment being provided on opposite faces with a rib 45, which collectively form a continuation of the ribs 38 formed on the band and which, like the ribs of the band, are designed to travel in the grooves of the first and third sections already referred to. The several segments are connected by a series of links 46, disposed on each face of the segment and resting along the outer edge of the rib 45, the body of each link being secured by a pin 47 to the segment and the coupling-arms 48 of each link having their adjacent surfaces scarfed or recessed, so as to make a joint which shall be continuous with the faces of the links, the coupling-pin 49 extending from a pair of arms on one side to a corresponding pair on the opposite side, each pin being partially embraced by a semicylindrical depression or groove 50, formed on each side of the segment directly below its back or outer grooved surface and transverse to the groove 14 thereof. The grooves 14 collectively form a continuation of the peripheral wire-receiving groove 14 formed in the band 37.

The third section of the feed-roll comprises a closed ring 52 of the full diameter of the roll and, like the head of the first section, is provided on one face with a circular groove 33', bounded on its inner side by a raised wall or rib 34'. The object of having the ribs 34 34' raised is to allow more bearing-surface for the tongues or ribs of the band 37 and its articulated extension, the tongues being constructed so as to accurately fit the formation of the grooves thus formed in the head and in the coupling-ring 52. The ring 52 slips over the peripheral surface of the offset of the head, being subsequently secured by screws 53, driven into the head from the side opposite to that of the pinion-supporting spindle 41 and passing through the basal screw-threaded openings 54 of the inwardly-radiating channel-arms 55, secured by means of screws 51 to the outer face of the ring. In this way the ring 52 becomes coupled to the head and firmly secures the second section between the parts thus coupled. When the parts are assembled, it is obvious, of course, that the rib 36 formed on the guide-block enters the groove 33' formed in the coupling-ring. The rib 34' of the latter is cut away like the rib 34 opposite the mouth of the pocket 29 to allow for the free passage of the articulated extension of the band into and out of said pocket. The channels of the arms 55 of the coupling-ring are provided with stiff spring arms or plates 56, secured by pins or screws 57 at the free ends of the arms, the plates being cut away to allow for the free passage of the securing-screws 53. When the parts are assembled, the inner faces of the arms (and the spring-plates carried by them) are received by corresponding recesses 58, formed in the adjacent face of the offset of the head, the screws 53 drawing the coupling-ring toward the head and against the adjustable band 37 (and extension thereof) against the resilient or springing action of the arms 56. With the parts thus firmly assembled it is impossible for the band 37 to shift from any position to which it has once been set. Upon loosening, however, the screws 53 sufficiently to release the grip which they exert upon the several parts the spring-plates 56 thus released and bearing as they do against the face of the offset will force the coupling-ring sufficiently out of contact with the band 37 to ease the latter and enable the operator by turning the pinion 40 to shift the band to a new position; but shifting the band to a new position results in varying the gap 15 between the ends of the available gripping-surface of the feed-roll, said gripping-surface of course extending from the end of the band to that segment of the articulated extension which has not yet entered the pocket 29. When the band has been shifted to a new position, the parts may again be firmly coupled and set by tightening the screws 53.

The manipulation or shifting of the band by turning the pinion in one direction or the other is of course obvious, and Figs. 3 and 5 show two different positions of said band and two different lengths of gap 15. It is obvious that as the gap of the feed-roll passes over the wire resting in the groove of the lower feed-roll the wire will cease to be fed forward, and it is during this interval of rest that the wire is cut. By varying the length of the gap the lengths of the wire cut are varied, and in the present device I have indicated the length of the wire in feet and inches (see Fig. 6) on the periphery of the feed-roll to which the sections severed will be cut when the free end of the band is brought in alinement with or opposite to the marks thus designated. Thus when the end of the band is brought opposite the mark "8," as in Fig. 6, or "8/3" the wire cut will be eight feet or eight feet and three inches, as the case may be. In order to prevent the wire from jumping out of the groove of the lower feed-roll when the gap of the upper feed-roll is passing over it, I provide the adjacent end of the guide-tube 21 with a yielding spring-finger 59, which bears against the top of the wire just sufficiently to prevent such accident. In order that there be no backlashing or accidental withdrawing of the wire after the feed is once started, I cause the wire to pass in advance of the feed-rolls between two spring-controlled cam-disks 60, pivoted to the frame of the machine in such a way as to allow the wire to feed forward, but jamming against the same should it tend to be drawn or slip in the opposite direction, the jamming or gripping being insured by the pressure of one arm of a spring 61, looped about a pin 62, the second arm bearing against a peg 63, located between it and the disk. It is apparent, of course, that by the jamming or gripping effect of the cam-disks the accidental withdrawing of the wire from between the feed-rolls at a time when the wire is released by reason of the gap in the upper roll is effectively prevented.

From the foregoing it is apparent that the feed-roll here described may not only be employed for regulating wire lengths supplied to the cutters of wire bale-tie machines of the character here specifically referred to, but may be used on any and similar classes of wire-manipulating machines where occasion may arise to operate on variable sections or lengths of wire.

While I have shown a rack-and-pinion principle for shifting the band by the position of which the length of the gap is determined and while I have described other details for effecting the results here referred to, I do not wish to limit myself to the precise details here set forth, but consider any and all equivalent devices as falling within the principle and spirit of my invention.

While the feed-roll here described is adapted for feeding wire, it is to be understood that a reconstruction of the same which will adapt it for feeding tape or metallic bands of any other character would still fall within the spirit of my invention, nor do I wish to be understood as limiting the application of my invention to the upper feed-roll, for it is clearly obvious that the same principle may be applied to the lower feed-roll.

Having described my invention, what I claim is—

1. In a machine of the character described, a sectional feed-roll having a body portion, and an open peripheral wire feeding or gripping section partially embracing said body portion, the continuity of the feeding-surface being interrupted by a gap between the limits of which the wire is released, and means for bodily shifting the position of said peripheral section about the body portion, and simultaneously varying the length of said section from the ends thereof, thereby varying the length of the gap between the terminals of the available gripping or feeding surface thus formed, substantially as set forth.

2. In a machine of the character described, a feed-roll having a peripheral open band over which the wire is adapted to travel, and means for varying the distance between the ends of the wire-engaging portion of said band, whereby the intervals of release of the wire may be varied at will, substantially as set forth.

3. In a machine of the character described, a feed-roll having a peripheral open band comprising a rigid circular portion, an articulated extension carried by the rigid portion, and means for varying the distance between the free end of the rigid portion and the effective gripping end of the articulated extension, whereby the interval of release of the wire may be varied, substantially as set forth.

4. In a machine of the character described, a feed-roll having a peripheral open band comprising a rigid circular portion, an articulated extension for the same, a pocket for receiving the segments of the articulated extension, and means for rotatably shifting the position of the band whereby a predetermined number of the segments of the articulated extension may be forced into, or withdrawn from the pocket, thereby adjusting the distance or gap between the ends of the available gripping-surface of the band, substantially as set forth.

5. In a machine of the character described, a feed-roll having a suitable cylindrical head, a cylindrical and diametrically reduced offset forming part of the same, an open circular band having a rigid portion and an articulated extension adapted to travel along the periphery of the offset, a pocket formed in the offset and opening into the peripheral surface of the offset, and designed to receive the articulated extension of the traveling band, and means for shifting the band along the periphery of the offset, substantially as set forth.

6. In a machine of the character described, a feed-roll comprising a head having a diametrically-reduced portion or offset, a clamping-ring of the same diameter as the head and adapted to slip over the periphery of the reduced offset, an open band adapted to be received between, and guided by, the head and ring respectively, an articulated extension forming a part of said band, a pocket formed in the reduced portion of the head and opening into the peripheral surface thereof, and designed to receive the articulated extension of the band, means carried by the head for guiding the articulated extension into the pocket, and means for shifting the band about the reduced portion of the head and causing variable lengths of the articulated extension to enter the pocket, substantially as set forth.

7. In a machine of the character described, a feed-roll comprising a head having a diametrically-reduced portion or offset, a clamping-ring of the same peripheral diameter as the head adapted to slip over the offset, circular grooves formed along the adjacent faces of the head and ring respectively along circles exterior to the peripheral surface of the offset, an open band having a rigid portion and an articulated extension adapted to be received between the head and ring, and having ribs or tongues adapted to enter the grooves of the head and ring respectively and be guided by the same, a pocket formed in the offset and extending from the periphery thereof a suitable distance into the body of the offset, teeth carried by a portion of the inner circle of the rigid portion of the band, a pinion mounted in the offset of the head and meshing with the teeth of the band, means for clamping the several parts together, the pinion being adapted to be turned and the band correspondingly shifted upon a slight loosening of the parts, and a guide-block carried by the head and located adjacent to the outer curve of the pocket for guiding the articulated section of the band into or out of the pocket, the block being provided with a rib on the side facing the ring, said rib being adapted to enter the groove of the ring when the parts are assembled, the whole being adapted to be mounted on a suitable shaft, substantially as set forth.

8. In a feed-roll having a central adjustable band, an articulated extension forming a part of said band, said extension comprising a series of segments tapering in planes parallel to the axis of rotation of the feed-roll, a link secured to each segment, on each face thereof, the coupling-arms of each pair of links having their adjacent faces recessed or scarfed to make a smooth joint, a rib formed on each face of each segment below the link, the narrow ends of the segments being adapted to travel along or adjacent to the surface of the reduced portion of the head by which they are carried, substantially as set forth.

9. In a machine of the character described, a feed-roll comprising a cylindrical head having a reduced portion or offset, a ring adapted to slip over said reduced portion, a traveling peripheral band confined between the head and ring, springs carried by the ring and bearing against the face of the offset, and suitable screws for drawing the ring snugly to the band against the resilient action of the springs, whereby when the band is once adjusted, the same may be held firmly in place, substantially as set forth.

10. In a machine of the character described, the combination of an upper and lower feed-roll, having peripheral grooves for gripping the wire, one of said rolls having a gap in the groove for momentarily releasing the wire, and a spring-arm normally bearing against the wire at the delivery side of the rolls, and preventing the wire from leaving the groove of the opposite roll during the moment of release by the gap of the adjacent feed-roll, substantially as set forth.

In testimony whereof I affix my signature in presence of two witnesses.

CHAS. O. SOBINSKI.

Witnesses:
　EMIL STAREK,
　GEORGE L. BELFRY.